United States Patent [19]

Ho

[11] Patent Number: 5,452,681
[45] Date of Patent: Sep. 26, 1995

[54] COLLAPSIBLE ANIMAL HOUSE ASSEMBLY

[76] Inventor: Ying-Kuon Ho, No. 22, Alley 18, Lane 75, An Ping Road, Tainan, Taiwan, Prov. of China

[21] Appl. No.: 304,894

[22] Filed: Sep. 13, 1994

[51] Int. Cl.⁶ ............................................... A01K 31/08
[52] U.S. Cl. ........................................................ 119/17
[58] Field of Search ................. 119/17, 19; 446/105, 446/112, 114, 115

[56] References Cited

U.S. PATENT DOCUMENTS

| | | | |
|---|---|---|---|
| 2,065,923 | 12/1936 | Jessen | 119/17 |
| 2,331,866 | 10/1943 | Grogan | 119/17 |
| 3,116,847 | 1/1964 | Collins | 119/19 |
| 3,774,576 | 11/1973 | Moore | 119/17 |
| 4,807,808 | 2/1989 | Reed | 119/19 |
| 4,901,672 | 2/1990 | Rosenberger | 119/19 |
| 5,036,795 | 8/1991 | Houghton | 119/17 |

Primary Examiner—Todd E. Manahan
Attorney, Agent, or Firm—Pro-Techtor International

[57] ABSTRACT

An animal house includes a cap, a base, four posts and four walls secured together. Both the cap and the base include a groove formed in the inner peripheral portion, and the posts each includes two slots for engaging with the edges of the walls so as to solidly secure the walls in place. Four nuts are engaged in both tile base and the cap for engaging with bolts of the posts. The nuts of tile base include a convex bottom portion for engaging with a concave upper portion of the nuts of the cap such that the animal houses may be stably superposed with each other. The animal house may be folded to a compact configuration.

2 Claims, 5 Drawing Sheets

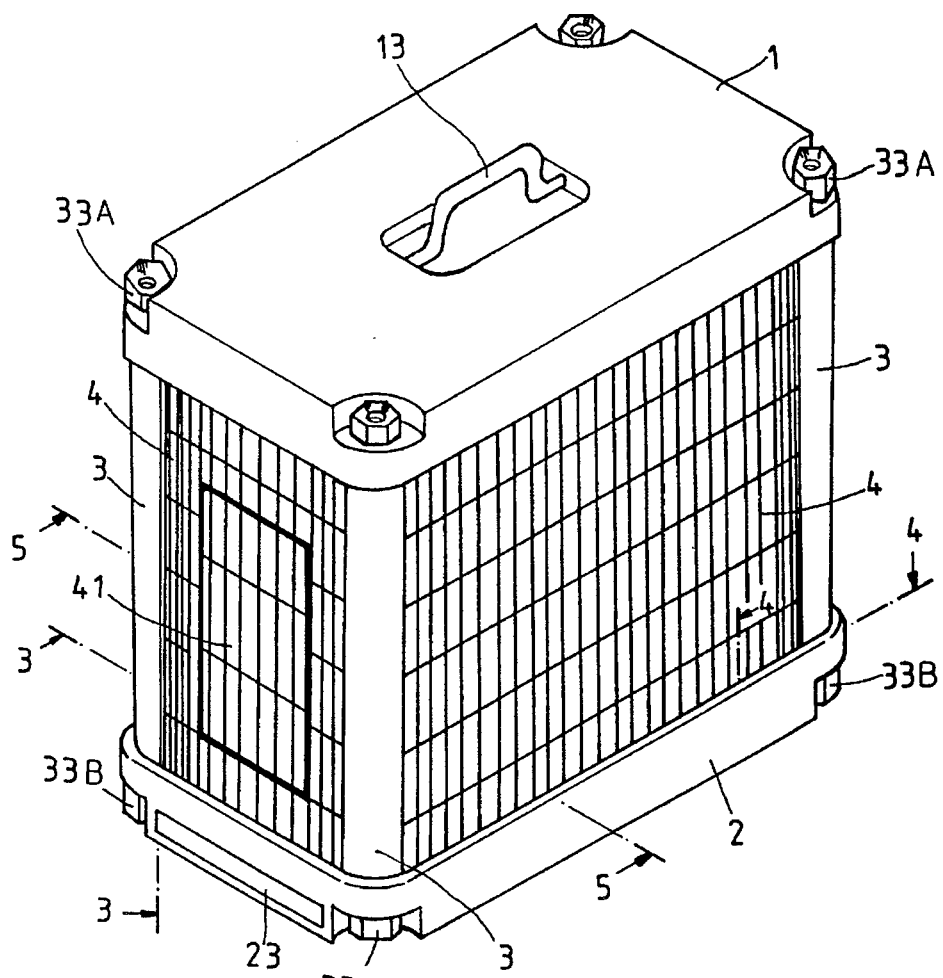
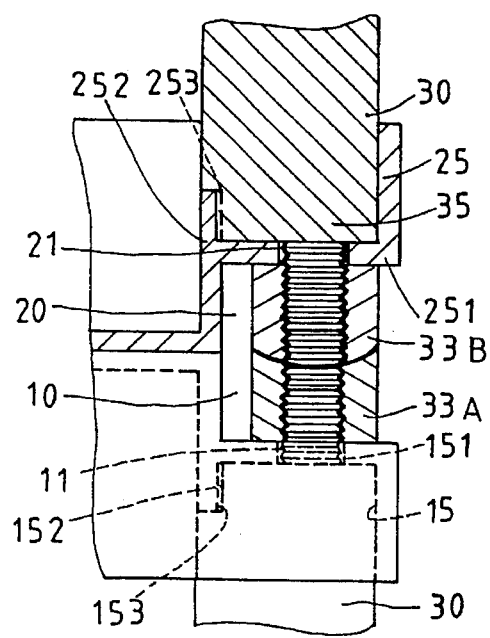

COLLAPSIBLE ANIMAL HOUSE ASSEMBLY

BACKGROUND OF THE INVENTION

1. Field of the Invention

The present invention relates to an animal house, and more particularly to an animal house assembly having solid structure and excellent for assembling purposes.

2. Description of the Prior Art

Typical animal houses comprises two types, one has solid configuration that can not be easily assembled and disassembled by the users; another type includes a configuration that may be easily assembled by the users. However, normally, the assembled configuration may not be stably retained in place and may be easily damaged.

The present invention has arisen to mitigate and/or obviate the afore-described disadvantages of the conventional animal houses.

SUMMARY OF THE INVENTION

The primary objective of the present invention is to provide an animal house assembly which includes a solid configuration that may be easily assembled.

In accordance with one aspect of time invention, there is provided an animal house assembly comprising a base including a first groove formed in an inner peripheral portion thereof, four corners having an inner portion and an outer portion, four first notches formed in the outer portions of the corner areas, four first recesses formed in the inner portions of the corner areas, a cap including a second groove formed in an inner peripheral portion thereof, four corners having an inner portion and an outer portion, four second notches formed in the outer portions of the corner areas, four second recesses formed in the inner portions of the corner areas, four posts secured between the corner areas of the cap and the base and each including two ends having a bolt secured thereto for engaging through the cap and the base and for engaging into the first notches and the second notches, the posts including engaging members formed in the ends for engaging with the recesses so as to be solidly secured to the cap and the base, the posts each including two slots longitudinally formed therein, means for engaging with the bolts so as to secure the cap, the base and the posts together, and four wall members including edges for engaging with the first grooves of the base, the second grooves of the cap and the slots of the posts such that the wall members are solidly secured in place.

The engaging means includes four first nuts engaged in the first notches of the base for engaging with the bolts, four second nuts engaged in the second notches of the cap for engaging with the bolts, the second nuts each includes a concave upper portion and the first nuts each includes a convex bottom for engaging with the concave upper portion of the second nuts.

Two or more curved strap members are further provided for securing the base and the walls together and each includes a plurality of teeth for engaging with the base and includes a plurality of hook members for engaging with the walls.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a perspective view of the animal house;

FIGS. 3, 4, 5 are cross sectional views taken along lines 3–3, 4–4, 5–5 of FIG. 2 respectively;

DETAILED DESCRIPTION OF THE PREFERRED EMBODIMENT

Figure 1:
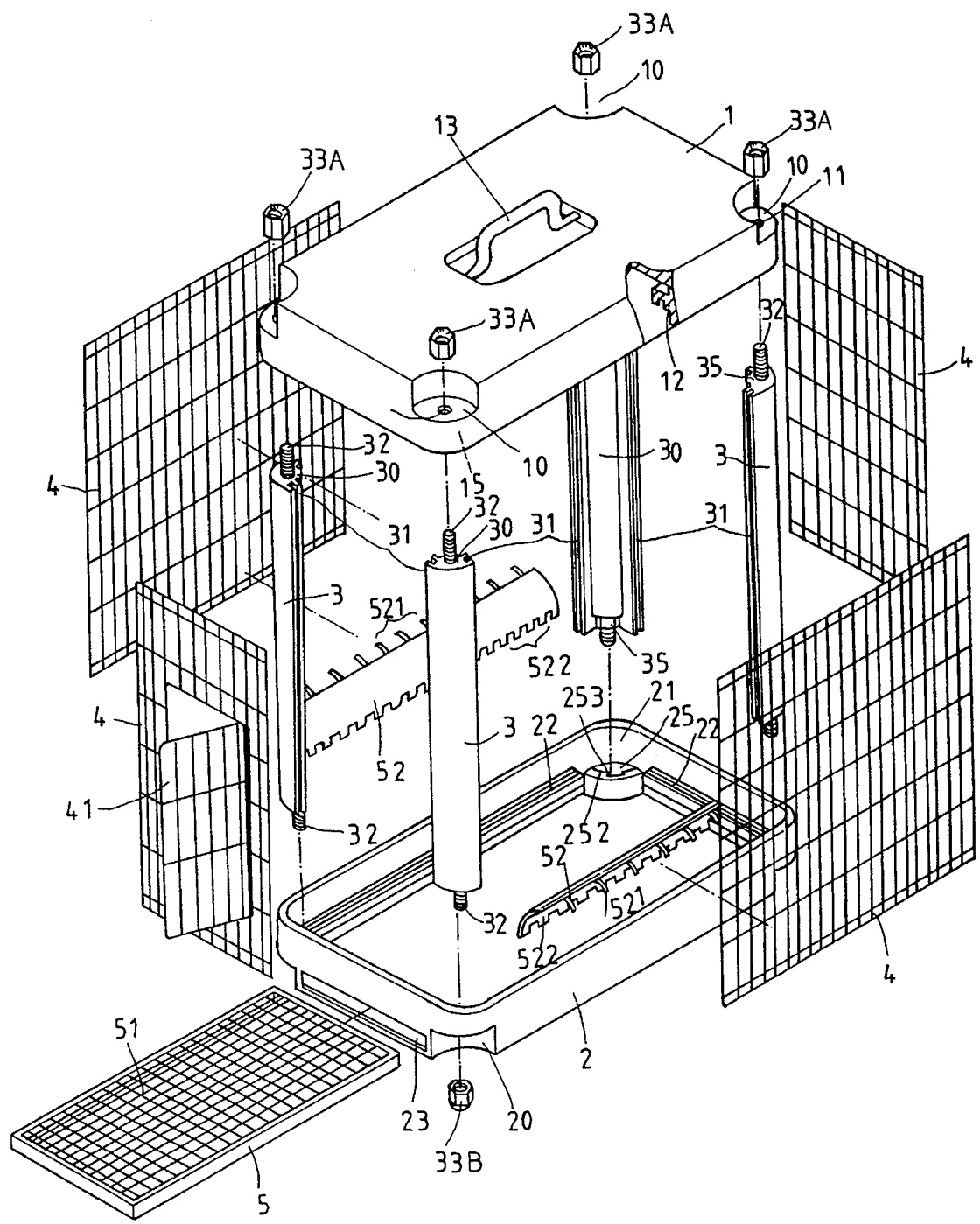
FIG. 1 is an exploded view of an animal house in accordance with the present invention.

Referring to the drawings, and initially to FIGS. 1 to 5, an animal house assembly in accordance with the present invention comprises generally a cap 1, a base 2, four posts 3 and four upstanding and perforate or open mesh walls 4. The cap 1 and the base 2 each includes four corner areas having notches 10, 20 formed in the outer portion and holes 11, 21 formed therein for receiving nuts 33A, 33B and bolts 32 respectively. The bolts 32 are secured to tile end portions of the posts 3 and extend through the holes 11, 21 for engaging with the nuts 33A, 33B so as to solidly secure the cap 1, the base 2 and the posts 3 together and so as to form the skeleton of the animal house. The cap 1 includes a depression formed therein for receiving a hand grip 13.

Figure 4:
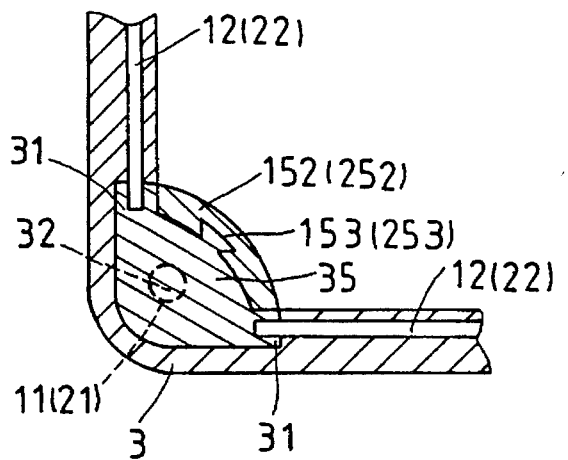

Both the cap 1 and the base 2 include a groove 12, 22 formed in tile inner peripheral portion thereof for engaging with tile upper and lower edges of the walls 4. Both the cap 1 and the base 2 includes four recesses 15, 25 formed in the inner portion of the four corner areas thereof, the recesses 15, 25 are defined by partitions 151, 152, 251, 252 respectively (FIGS. 3, 4). The holes 11, 21 are formed in the partitions 151, 251 for engaging with bolts 32. The partitions 152, 252 each includes a cavity 153, 253 formed therein. The posts 3 each includes a post body 30 having two slots 31 longitudinally formed therein and perpendicular with each other for engaging with side edges of the walls 4. The slots 31 are each defined by a pair of longitudinal ribs. The post bodies 30 each includes an upper end and a lower end having an engaging member 35 formed thereon for engaging with the recesses 15, 25 respectively such that the posts 3 may be solidly secured to the cap 1 and the base 2. The engaging members 35 each includes a protrusion for engaging with the cavities 153, 253 of the partitions 152, 252 so as to further solidly secure the posts 3 to the cap and the base.

Figure 5:
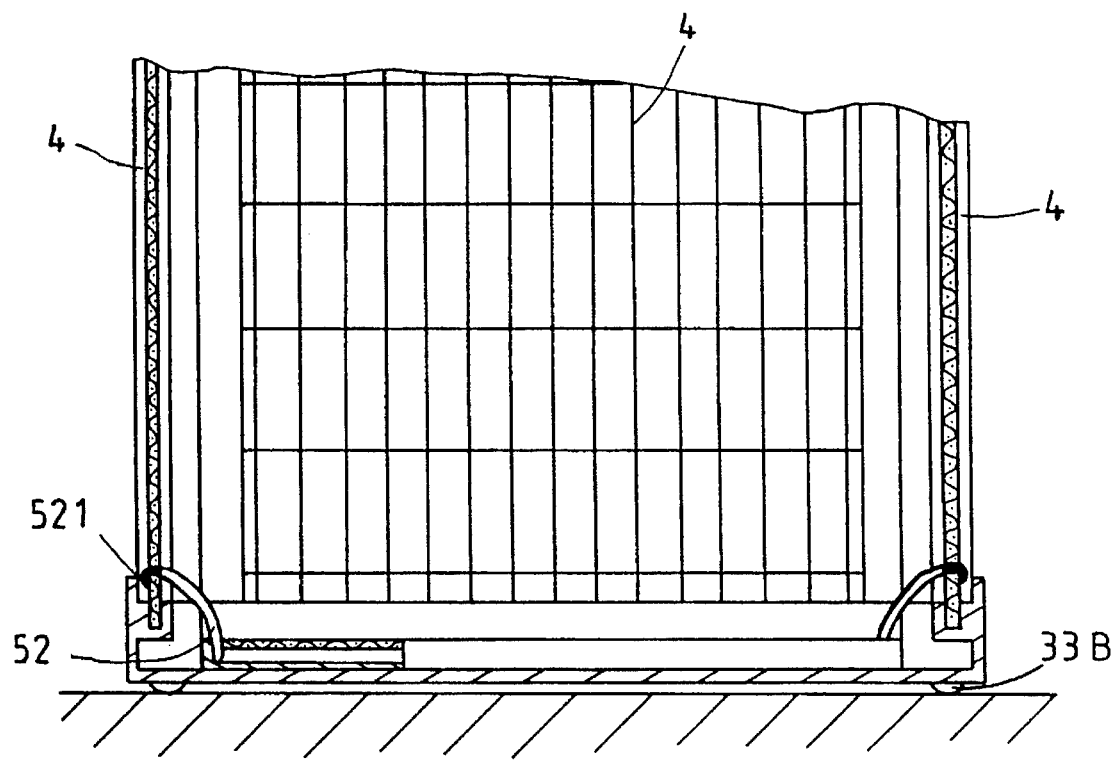

The base 2 includes a channel 23 formed therein for engaging with a tray 5 which includes a mesh member 51 provided therein. As best shown in FIGS. 1 and 5, two curved strap members 52 are engaged between two of the walls 4 and the mesh member 51 of the base 2, and each includes a number of teeth 522 for engaging with the mesh member 51 and a number of hooks 521 for engaging or hooking with the mesh type walls 4. One of the walls 4 includes a door 41 formed therein for forming an entrance to the animal house.

Figure 6:
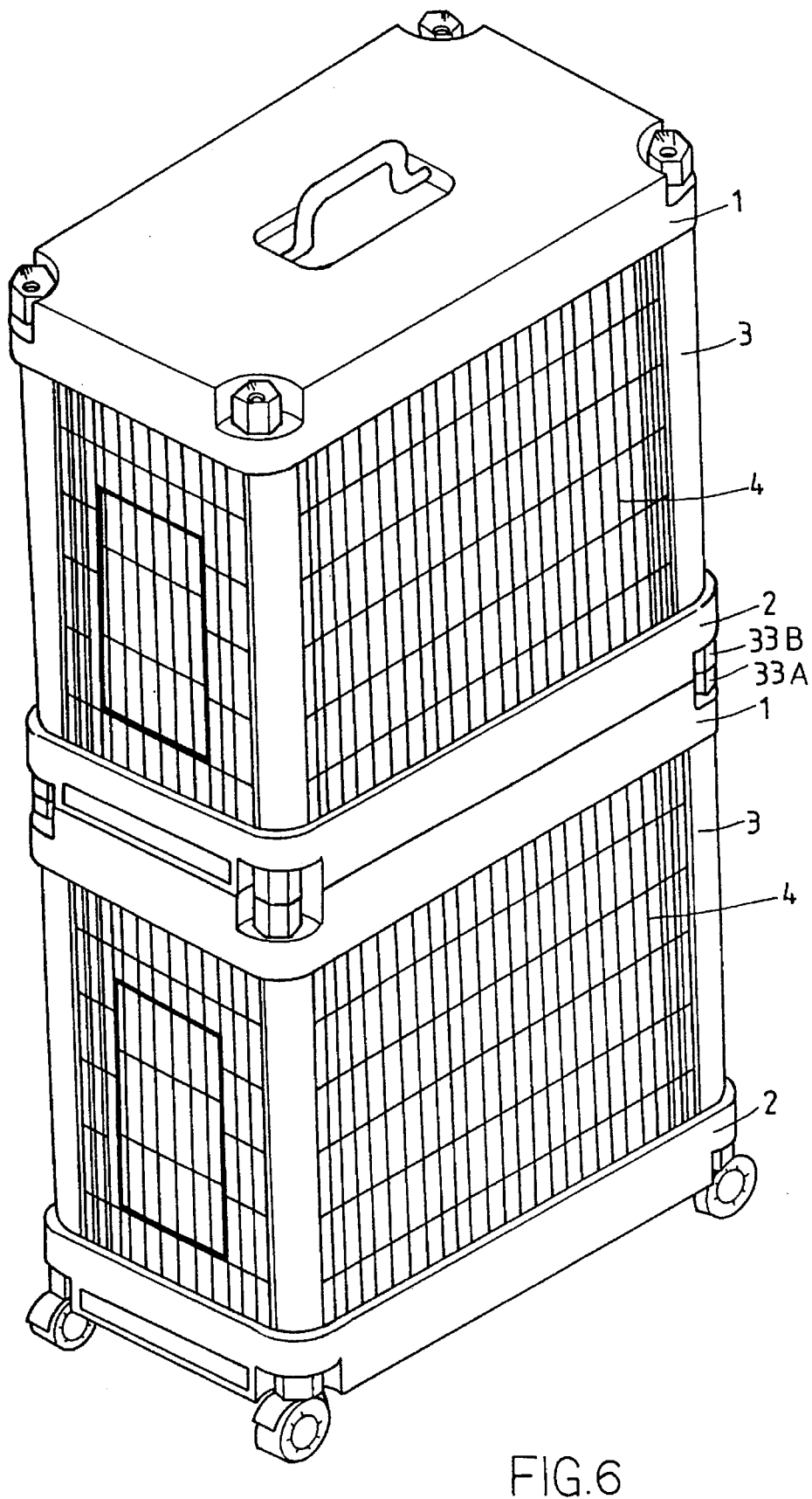
FIG. 6 is a perspective view illustrating two animal houses superposed with each other.

Referring next to FIG. 6 and again to FIG. 3, two or more animal houses may be superposed with each other. It is preferable that the nuts 33B engaged in the base 2 include a convex bottom portions for engaging with concave upper portions of the nuts 33A which are engaged in the cap 1 such that the superposed animal houses may be stably retained in place. Wheel members may be secured to the base 2 such that the animal houses may be easily moved.

Figure 7:
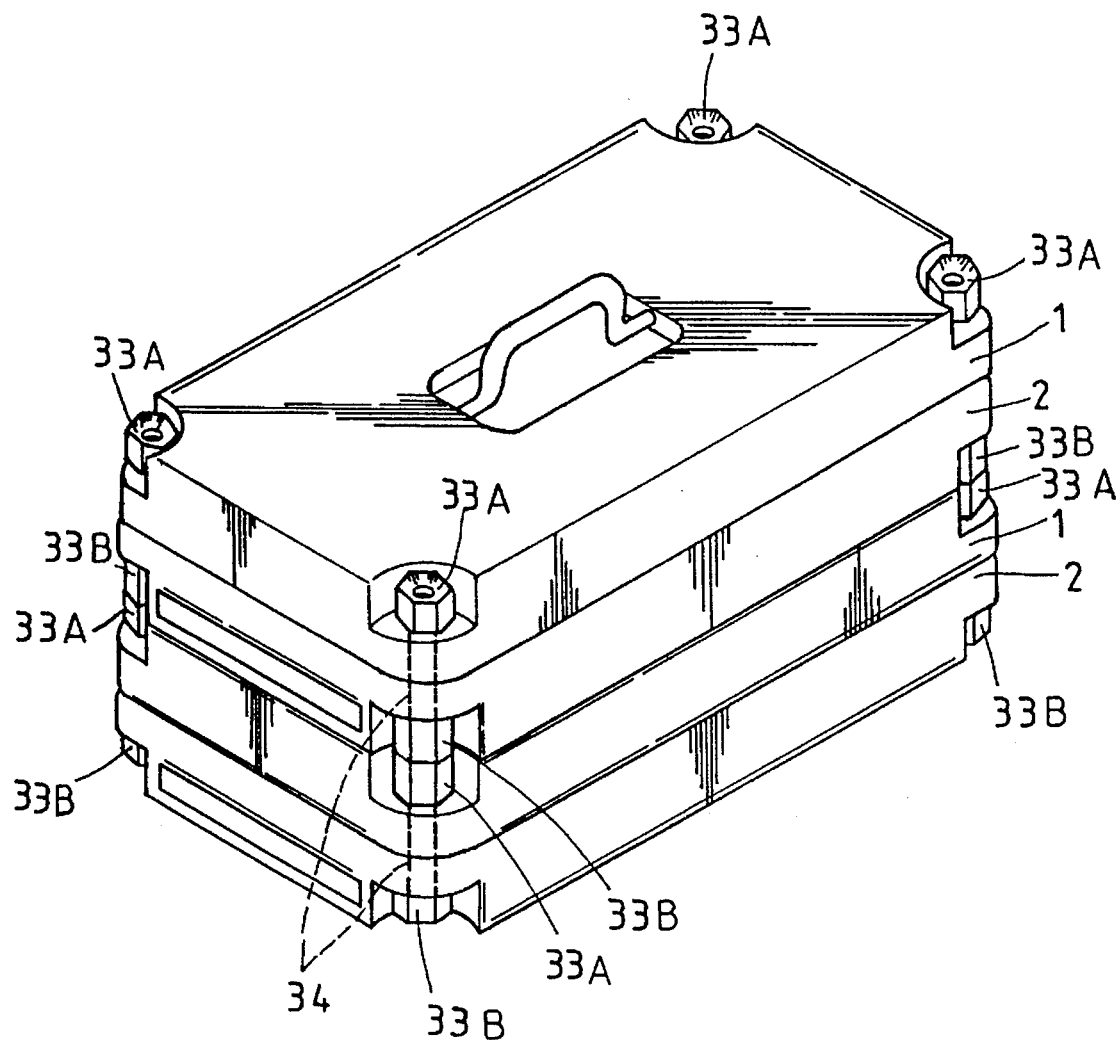
FIG. 7 is a perspective view illustrating two folded animal houses which are superposed with each other.

Referring next to FIG. 7, the posts 3 and the walls 4 may be received between the cap 1 and the base 2 such that the animal houses may be folded to a rather compact configuration which is excellent for transportation purposes. If the walls 4 include a size larger than that of the cap and base and may not be received in the cap and base, the walls 4 may be formed by two or more sections which may be folded to a small size that is suitable for being received in the lap and the base.

Accordingly, the animal house in accordance with the present invention includes a configuration that is excellent for assembling purposes and excellent for transportation purposes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An animal house assembly comprising:

a base including a first groove formed in an inner peripheral portion thereof, four base corners each having an inner portion and an outer portion, four first notches formed in said outer portions of said base corners, four first recesses formed in said inner portions of said base corners, a cap including a second groove formed in an inner peripheral portion thereof, four cap corners each having an inner portion and an outer portion, four second notches formed in said outer portions of said cap corners, four second recesses formed in said inner portions of said cap corners, four posts each secured between said corners of said cap and said base and each including two ends having a bolt secured thereto for engaging through said cap and said base and for engaging into said first notches and said second notches, said posts each including engaging members formed in said ends for engaging with said recesses so as to be solidly secured to said cap and said base, said posts each including two slots longitudinally formed therein, means for engaging with said bolts so as to secure said cap, said base, and said posts together, and four wall members including edges for engaging with said first grooves of said base, said second grooves of said cap, and said slots of said slots such that said wall members are solidly secured; and further including at least one pair of curved strap members each including a plurality of teeth for engaging with said base and including a plurality of hook members for engaging with said walls.

2. An animal house assembly comprising:

a base including a first groove formed in an inner peripheral portion thereof, four base corners each having an inner portion and an outer portion, four first notches formed in said outer portions of said base corners, four first recesses formed in said inner portions of said base corners, a cap including a second groove formed in an inner peripheral portion thereof, four cap corners each having an inner portion and an outer portion, four second notches formed in said outer portions of said cap corners, four second recesses formed in said inner portions of said cap corners, four posts each secured between said corners of said cap and said base and each including two ends having a bolt secured thereto for engaging through said cap and said base and for engaging into said first notches and said second notches, said posts each including engaging members formed in said ends for engaging with said recesses so as to be solidly secured to said cap and said base, said posts each including two slots longitudinally formed therein, means for engaging with said bolts so as to secure said cap, said base, and said posts together, and four wall members including edges for engaging with said first grooves of said base, said second grooves of said cap, and said slots of said slots such that said wall members are solidly secured; and wherein said engaging means includes four first nuts engaged in said first notches of said base for engaging with said bolts, four second nuts engaged in said second notches of said cap for engaging with said bolts, said second nuts each includes a concave upper portion and said first nuts each includes a convex bottom for engaging with said concave upper portion of said second nuts.

* * * * *